INVENTOR
LOWELL E. NORTON
BY
ATTORNEY

Nov. 13, 1956 L. E. NORTON 2,770,733
FREQUENCY STABILIZATION OF OSCILLATORS
Filed April 2, 1951 6 Sheets-Sheet 2

INVENTOR
*LOWELL E. NORTON*
BY
ATTORNEY

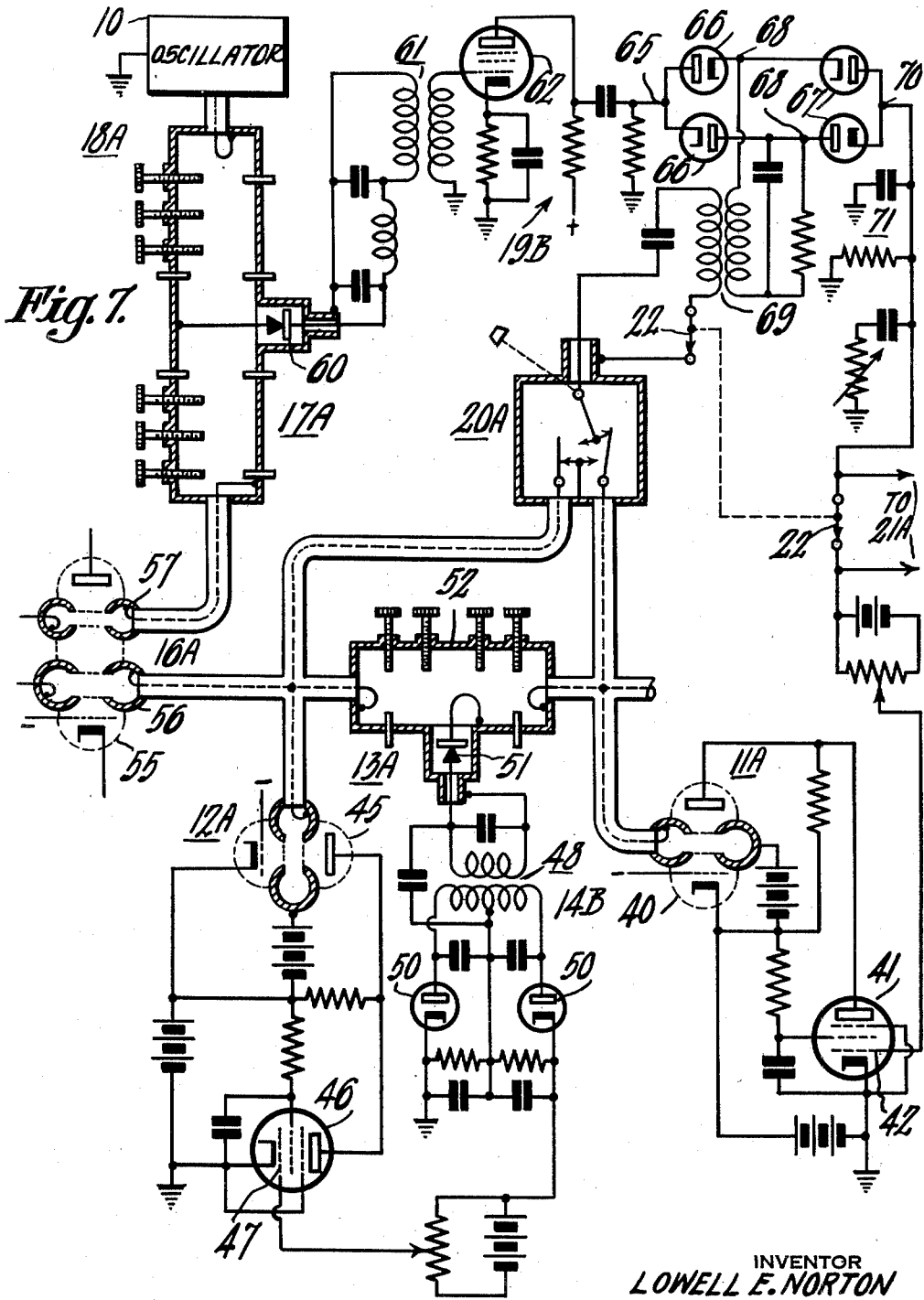

Nov. 13, 1956     L. E. NORTON     2,770,733
FREQUENCY STABILIZATION OF OSCILLATORS
Filed April 2, 1951     6 Sheets—Sheet 5
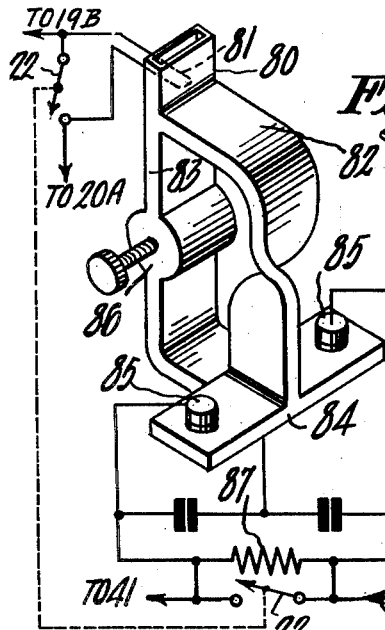
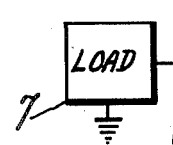
INVENTOR
LOWELL E. NORTON
BY
ATTORNEY

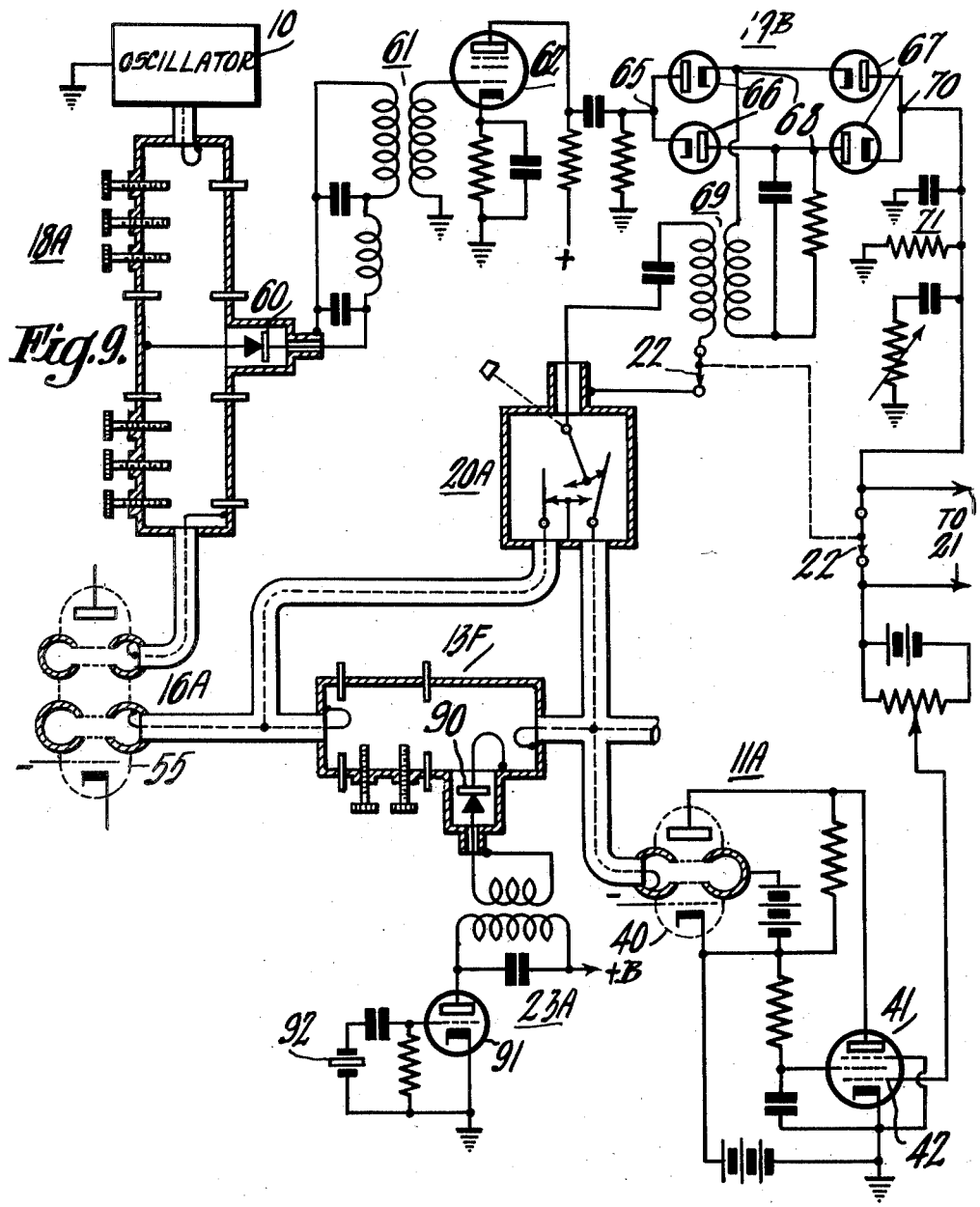

United States Patent Office 2,770,733
Patented Nov. 13, 1956

2,770,733
FREQUENCY STABILIZATION OF OSCILLATORS

Lowell E. Norton, Princeton, N. J., assignor to Radio Corporation of America, a corporation of Delaware Application April 2, 1951, Serial No. 218,807

7 Claims. (Cl. 250—36)

This invention relates to frequency stabilization of oscillators and particularly relates to methods of and systems for deriving a multiplicity of stabilized frequencies from a single higher frequency standard such as an absorption line of a gas.

In many of its aspects, the present invention is concerned with methods and arrangements which afford or provide availability of a multiplicity of frequencies each rigidly stabilized from a higher frequency standard which preferably and specifically is a selected absorption line of a gas. As disclosed in copending applications, some of which are specifically referred to herein, the molecular resonance exhibited by various gases, including ammonia, at low pressure have been utilized for frequency stabilization of oscillators. In general, the prior arrangements and methods provide a single stabilized frequency which in most cases either corresponds with a microwave frequency at which molecular resonance occurs or is of the same order as that frequency.

In accordance with the present invention, a selected sub-harmonic of a frequency rigidly stabilized, as from a gas line, is combined with a selected harmonic of oscillations to be frequency stabilized and the resulting relatively low difference frequency is compared to the frequency of the generated oscillations to produce an error signal which is utilized, as in a servo loop, to effect rigid stabilization of the generated oscillations at any one of many frequencies afforded by permutation of selected harmonic and sub-harmonic frequencies used in producing the aforesaid frequency difference. The selection may simply be effected by switching or plug-in substitution of frequency-selective circuit elements such as filters.

Further in accordance with the invention, the number of available stabilized frequencies may be substantially increased, for the same range of selection of sub-harmonic and harmonic frequencies by generating two frequencies differing by fixed amount and either of which may be selected for frequency multiplication and/or for comparison with the aforesaid difference frequency to provide the error signal.

Further in accordance with the invention, the number of available stabilized frequencies may be further increased by additionally using a discriminator whose output provides a component of the error signal which is zero value only when the frequency of generated oscillators differs from the aforesaid difference frequency by a predetermined offset frequency.

Further in accordance with the invention, the desired sub-harmonic of the gas line frequency is preferably generated by providing in the feedback loop between cavity resonators of a klystron or equivalent resonant cavity oscillator a comparator whose output circuit is coupled to one of the cavities and whose input circuits are connected to the other cavity, one of the input circuits including a gas cell and a frequency multiplier whose multiplication factor corresponds with the ratio of the gas line frequency to the desired oscillator frequency and the other of the input circuits including a frequency multiplier whose multiplication factor differs by unity from the first-named multiplier.

The invention further resides in the methods, systems and arrangements having the features of novelty and utility hereinafter described and claimed.

For a more detailed understanding of the invention and for illustration of systems embodying, reference is made to the accompanying drawings in which.

Figure 1:
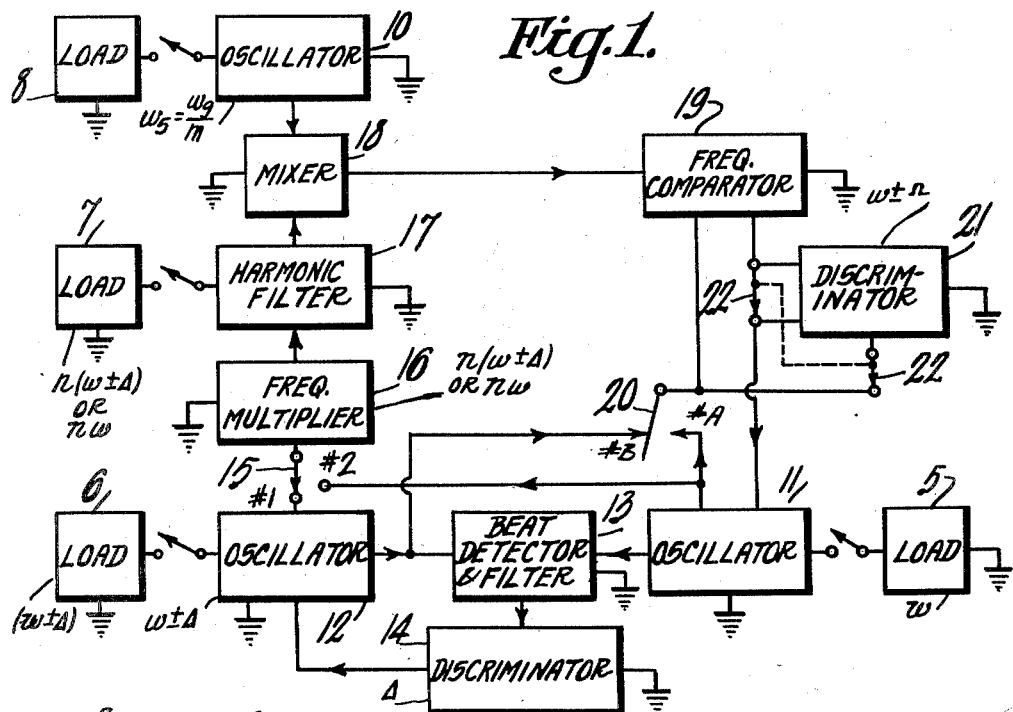
Figures 1, 2 and 3 are block diagrams illustrative of methods and systems for providing a plurality of stabilized frequencies from a single higher frequency standard.
Figure 2:
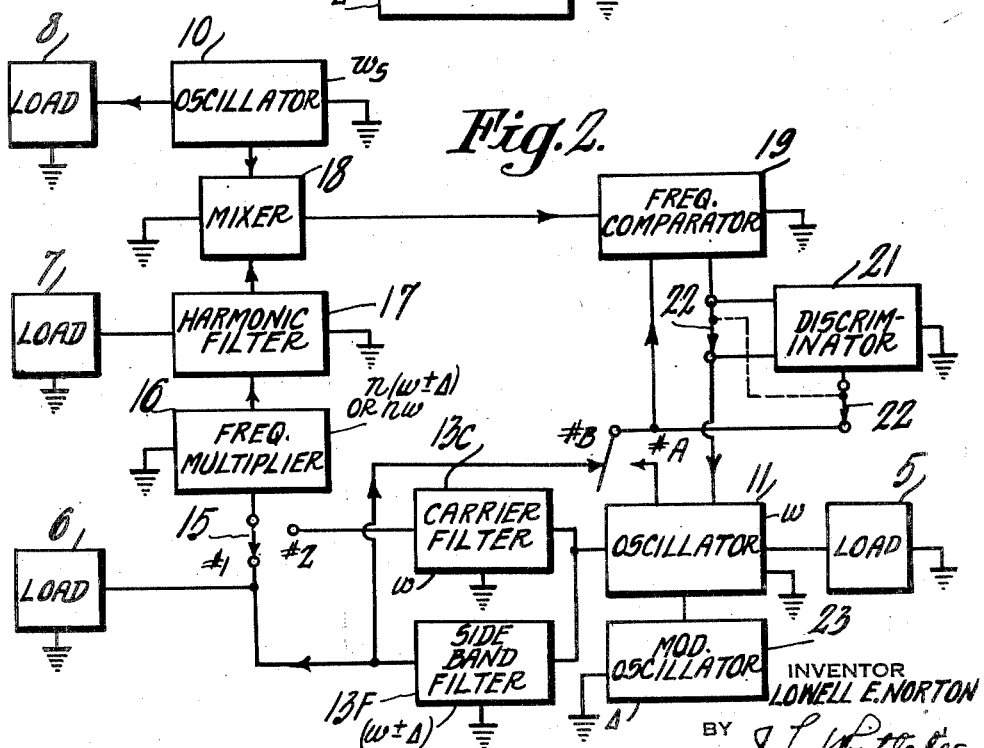
Figure 3:
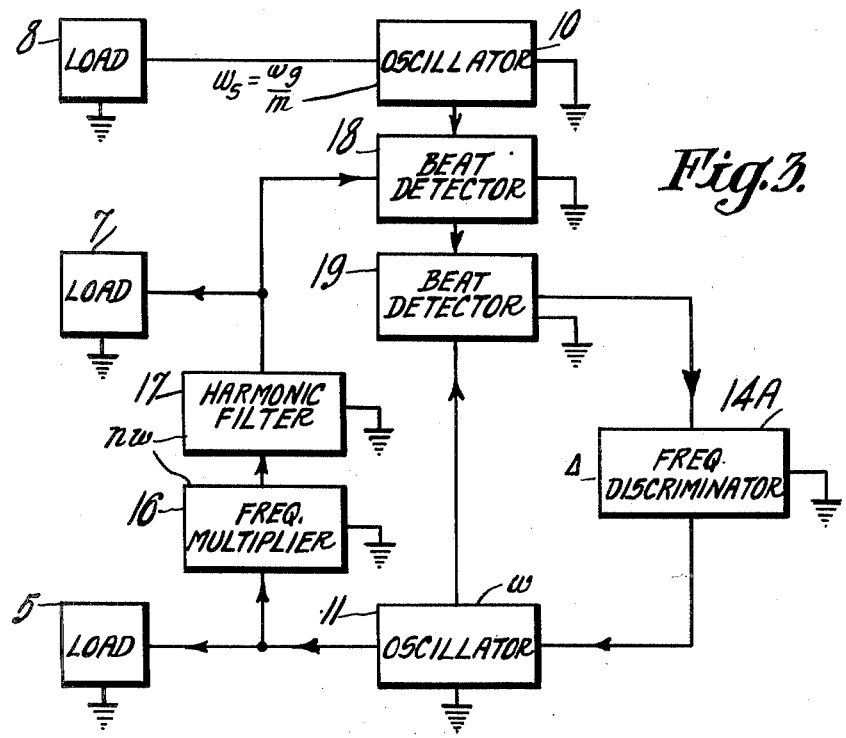

Fig. 7 schematically illustrates a specific form of the system shown in Fig. 1;

Fig. 8 illustrates a microwave discriminator utilizable in the systems of Figs. 1, 2, 3, 7, 9 and 10; and Figs. 9 and 10 schematically illustrate specific forms of the systems of Figs. 2 and 3 respectively.

Referring to Fig. 1, the oscillation generator 10 produces oscillations of frequency $\omega_s$ which is the $m$th sub-harmonic of a standard frequency $\omega_g$ corresponding with or stabilized from a molecular resonant frequency of a gas at suitable low pressure. Various frequency stabilizing methods and systems utilizing the absorptive or dispersive properties of many gases, including ammonia, are disclosed in copending applications including Serial No. 1,240, No. 4,497, and No. 5,603 now Patent Nos. 2,712,068, 2,702,351 and 2,559,730, respectively.

Figure 4:
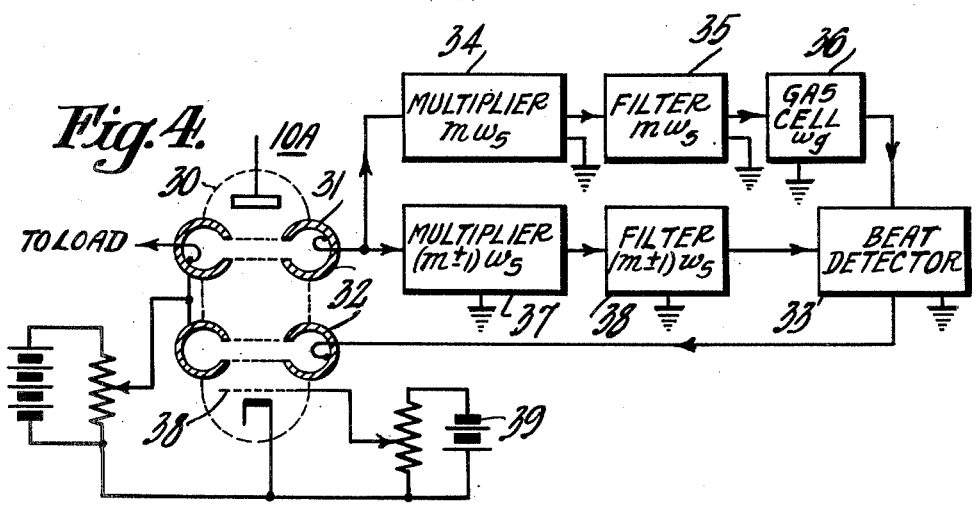
Figs. 4, 5 and 6 are exemplary of microwave sub-harmonic generators utilizable in the systems of Figs. 1–3, 7, 9 and 10.
Figure 5:
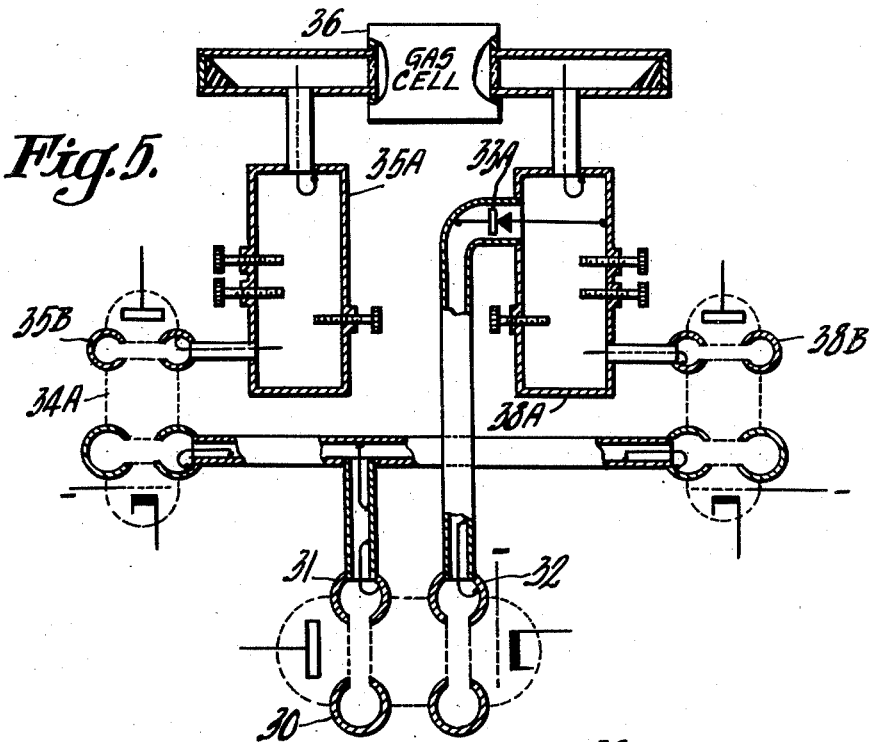
Figure 6:
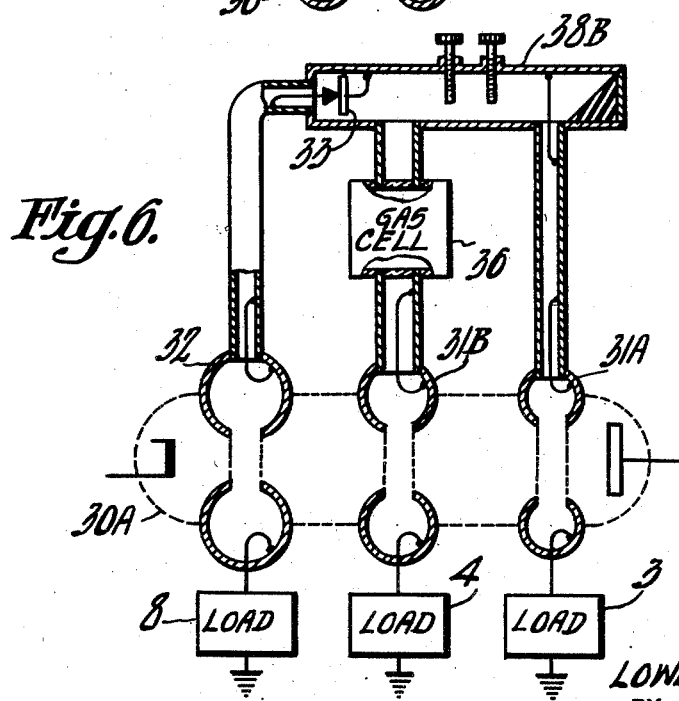

Preferred arrangements for generating a selected sub-harmonic of a gas line frequency are shown in Figs. 4–6 and later specifically described.

The oscillators 11 and 12 to be stabilized from the microwave standard operate at substantially lower frequencies whose difference $\Delta$ is maintained substantially constant. In the particular system shown in Fig. 1, the frequency difference $\Delta$ is maintained constant by servo arrangement including a beat detector 13 and a discriminator 14. The outputs of the oscillators 11 and 12 are impressed upon the detector 13 to provide a difference frequency or beat supplied to the discriminator. Upon deviation of the beat frequency from the null-output frequency $\Delta$ of the discriminator, the direct-current output of the discriminator is of polarity and magnitude corresponding with the deviation. This direct current output of reversible polarity is applied, in manner known per se, to the oscillator 12 to change its frequency ($\omega+\Delta$ or $\omega-\Delta$) in correction for the deviation.

As thus far described, neither of the oscillators 11 or 12 is stabilized but oscillator 12 is controlled by the servo loop including detector B and discriminator 14 to maintain its frequency of fixed amount $\Delta$ higher or lower than the frequency of oscillator 11. The discriminator 14 should include or there should be provided a switch to select either the frequency ($\omega+\Delta$) or the frequency ($\omega-\Delta$) by reversal of the polarity of the control voltage to oscillator 12.

Assuming the circuit connections correspond with those afforded by closure of switch 15 in the No. 1 position, the output of oscillator 12 is impressed upon a frequency-multiplier or harmonic generator 16 which may, for example, be a klystron multiplier tube or for very high frequencies may be crystal diode. The filter 17 selects from the output of the frequency multiplier the desired $n$th harmonic of the input frequency for impression upon a mixer 18. The filter 17 need not be elaborate since its its only duty is to exclude the next higher and lower harmonics $(n+1)(\omega+\Delta)$ which are substantially removed from the desired frequency $n(\omega+\Delta)$.

Upon the mixer 18, which particularly for very high frequencies may also be a crystal diode, is also impressed the output of the oscillation generator 10 which is frequency stabilized at a submultiple of a gas spectral line frequency, $$\frac{\omega_g}{m}$$

with the result that the mixer output includes the frequency $$\left[\frac{\omega_g}{m}-n(\omega+\Delta)\right]$$

The stabilized oscillator 10 may make use of the dispersion properties of an absorption phenomena as disclosed in application Serial No. 5,603, filed January 31, 1948, or of the absorption property of the phenomena as disclosed in application Serial No. 4,497, filed January 27, 1948. This difference frequency is impressed upon one input circuit of a comparator 19, the sum frequency being effectively eliminated in known manner, as by a simple filter (not shown) which may be a single tuned circuit or resonant chamber.

Assuming the circuit connections are those afforded by closure of switch 20 in the B position, the output frequency of oscillator 12 is impressed upon the other input circuit of comparator 19 which is preferably a coincidence detector or phase comparator such as disclosed in copending applications Serial Nos. 4,497, filed January 27, 1948; 49,934, filed September 18, 1948, now Patent No. 2,602,897, 35,185, filed June 25, 1948, now Patent No. 2,584,608.

The output of the comparator 19 is a direct current voltage of polarity and magnitude dependent upon the sense and extent of the phase deviation betwen the output frequencies of mixer 18 and oscillator 12. This voltage is applied, in manner per se known, to the oscillator 11 to correct any deviation and so closely to maintain the frequency $\omega$ of oscillator 11 at one of the selected values $$\omega = \frac{\omega_g}{m(n+1)} + \Delta$$

or $$\omega = \frac{\omega_g}{m(n+1)} - \Delta$$

The oscillator 11 is therefrom stabilized from the gas line frequency $\omega_g$ by the servo loop including the mixer 18 and the comparator 19.

Because the second servo loop including discriminator 14 maintains a fixed difference between the frequencies of oscillators 11 and 12, it follows from the gas line stabilization of oscillator 11 that the frequency of oscillator 12 is closely maintained at the selected one or the other of the frequencies $$(\omega+\Delta) = \frac{\omega_g}{m(n+1)}$$

or $$(\omega-\Delta) = \frac{\omega_g}{m(n+1)}$$

It is to be noted that the sole or major term of each of the aforesaid frequencies includes the gas line frequency in the numerator and the factors $m$ and $n$, corresponding with the order of the selected sub-harmonic and harmonic, in the denominator. Since the gas line frequency is a value rigidly fixed by natural law and since the factors $m$ and $n$ are constants unaffected by operating variables including temperature, voltage and the like, such sole or predominatnt term is most precisely fixed. The $\Delta$ term may be subject to drift or shift due, for example, to the effect of ambient or operating conditions upon the null output frequency $\Delta$ of discriminator 14 but since this frequency is but a small fraction or frequency $\omega$ and since the drift may easily be held to a small fraction of $\Delta$ any instability of $\omega$ due to this term is minute.

With no change in circuit constants or operating parameters, high-frequency power may be supplied to loads 5, 6, 7 and 8, as indicated in Fig. 1, at any one or more of four frequencies, namely, $\omega$, $(\omega+\Delta)$, $n(\omega+\Delta)$ and $\omega_g$, each rigidly stabilized from the single selected gas line frequency $\omega_g$. By way of specific example, assuming the gas line frequency to be 24,000 megacycles, that the integers $m$ and $n$ are each 2, and that $\Delta$ is 10 megacycles, the four available stabilized frequencies for one of the two possible frequencies, $\omega+\Delta$, for oscillator 12 and controlled by discriminator 14 are respectively 3990, 4000, 8000 and 12,000 megacycles. By throwing a switch in discriminator 14 to reverse the polarity of the control voltage to oscillator 12 to select the other controlled frequency $\omega-\Delta$, the four available frequencies are $\omega,(\omega-\Delta)$, $n(\omega-\Delta)$, and $\omega_g$ are respectively 4010, 4000, 8000, and 12,000 megacycles. The selection of either $\omega+\Delta$ or $\omega-\Delta$ changes only the frequency $\omega$ of oscillator 11.

By changing or adjusting the harmonic filter 17 so to change the factor $n$ and/or by changing the factor $m$ as later described, a large number of groups of frequencies may, as shown by Table A below, be stabilized from a single gas line frequency.

Table A $$\omega - \frac{\omega_g}{m(n+1)} - \Delta \quad \text{for} \quad \begin{array}{l}\omega_g \text{ 24,000 mc./s.} \\ \omega \text{ in mc./s.}\end{array}$$

| $m$ | $n$ | $\omega$ | $m(\omega+\Delta)$ |
|---|---|---|---|
| 4 | 6 | $(859-\Delta)$ | $(5,142-6\Delta)$ |
| 4 | 5 | $(1,000-\Delta)$ | $(5,000-5\Delta)$ |
| 4 | 4 | $(1,200-\Delta)$ | $(4,800-4\Delta)$ |
| 4 | 3 | $(1,500-\Delta)$ | $(4,500-3\Delta)$ |
| 4 | 2 | $(2,000-\Delta)$ | $(4,000-2\Delta)$ |
| 4 | 1 | $(3,000-\Delta)$ | $(3,000-\Delta)$ |
| 3 | 6 | $(1,142-\Delta)$ | $(6,856-6\Delta)$ |
| 3 | 5 | $(1,333-\Delta)$ | $(6,667-5\Delta)$ |
| 3 | 4 | $(1,600-\Delta)$ | $(6,400-4\Delta)$ |
| 3 | 3 | $(2,000-\Delta)$ | $(6,000-3\Delta)$ |
| 3 | 2 | $(2,667-\Delta)$ | $(5,333-2\Delta)$ |
| 3 | 1 | $(3,000-\Delta)$ | $(4,000-\Delta)$ |
| 2 | 6 | $(1,714-\Delta)$ | $(10,284-6\Delta)$ |
| 2 | 5 | $(2,000-\Delta)$ | $(12,000-5\Delta)$ |
| 2 | 4 | $(2,400-\Delta)$ | $(9,600-4\Delta)$ |
| 2 | 3 | $(3,000-\Delta)$ | $(9,000-3\Delta)$ |
| 2 | 2 | $(4,000-\Delta)$ | $(8,000-2\Delta)$ |
| 2 | 1 | $(6,000-\Delta)$ | $(6,000-\Delta)$ |
| 1 | 6 | $(3,428-\Delta)$ | $(20,571-6\Delta)$ |
| 1 | 5 | $(4,000-\Delta)$ | $(20,000-5\Delta)$ |
| 1 | 4 | $(4,800-\Delta)$ | $(19,200-4\Delta)$ |
| 1 | 3 | $(6,000-\Delta)$ | $(18,000-3\Delta)$ |
| 1 | 2 | $(8,000-\Delta)$ | $(16,000-2\Delta)$ |
| 1 | 1 | $(12,000-\Delta)$ | $(12,000-\Delta)$ |

As Fig. 1 has thus far been described, the basic stabilized relation, existent when the frequency of oscillator 12 is impressed upon one input circut of comparator 19, may be expressed as $$\omega = \frac{\omega_g}{m(n+1)} \pm \Delta \quad (1)$$

if instead the output of oscillator 11 is impressed upon that input circuti of comparator 19, the basic stabilized relation of Fig. 1 becomes $$\omega = \frac{\omega_g}{m(n+1)} \pm \frac{n\Delta}{n+1} \quad (2)$$

which, without change of circuit parameters, affords a new group of frequencies.

Again by way of specific example, with switch 20 in the beat position to impress the frequency $(\omega+\Delta)$ upon one input circuit of comparator 19, the available frequencies may be 3990, 4000, 8000 and 12,000 megacycles for values of $\omega_g$, $m$, $n$ and $\Delta$ above assumed: by throwing switch 20 to the A position to impress the output frequency $\omega$ upon the comparator, the available stabilized frequencies become 3993.3+, 4003.3+, 8006.6+ and 12,000 megacycles. The sign of the second term of Equation 2 may be reversed, as explained above in connection with Equation 1 by throwing a switch in discriminator 13 to reverse the polarity of the control voltage to oscillator 12 to select the other frequency $\omega-\Delta$ in which case the frequency $\omega$ is increased to become, in the case assumed, 4013.3 megacycles.

In the discussion thus far, it has been assumed that a selected harmonic of oscillator 12 was impressed upon mixer 18: if instead, a selected harmonic of oscillator 11 is impressed upon mixer 18, the basic stabilized relation of Fig. 1 becomes:

$$\omega = \frac{\omega_g}{m(n+1)} \qquad (3)$$

or $$\omega = \frac{\omega_g}{m(n+1)} \pm \frac{\Delta}{n+1} \qquad (4)$$

depending upon whether the output frequency of oscillator 11 or oscillator 12 is impressed upon phase comparator 19. Assuming the same values, $\omega_g$, $\Delta$, $m$ and $n$, as above, the four available stabilized frequencies are $\omega=4000$; $\omega-\Delta=3990$: $n\omega=8000$; and $\omega_s=12,000$ when frequency $\omega-\Delta$ is selected: for the other selected frequency $\omega+\Delta$, $\omega+\Delta=4010$, the other frequencies remaining the same. It is to be noted that in this case the selection of the difference frequency output of beat detector 13, $[(\omega+\Delta)-\omega]$ or $[\omega-(\omega-\Delta)]$, changes the frequency supplied by oscillator 12 to its load. These frequencies are obtained with switch 15 in the #2 position and switch 20 in the A position, which positions or equivalent connections establish the basic phase relation defined by Equation 3.

Now assuming that switch 15 remains in the #2 position, a switch 20 is thrown to the B position to establish the relationship defined by Equation 4, the four available stabilized frequencies are 4003.3+, 3993.3+, 8006.6+ and 12,000 or 4003.3, 4013.3, 8006.6 and 12,000 megacycles, depending upon which difference frequency $[(\omega+\Delta)-\omega]$ or $[\omega-(\omega-\Delta)]$ output of detector 13 is utilized.

In Fig. 1 as thus far described, the error signal for stabilization of frequency in accordance with one of the basic relationships defined by Equations 1 to 4, consists of the output of the comparator 19. By additionally impressing the output of oscillator 11 or 12 upon a discriminator whose null-output or center frequency is offset from the applied frequency and by algebraically adding the output of discriminator 21 to that of comparator 19, the resulting error signal will stabilize the frequency $\omega$ of oscillator 11 in accordance with four additional basic relationships defined by Equations 5 to 8 listed below.

Assuming the null output frequency of discriminator 21 is a selected one of the frequencies $(\omega\pm\Omega)$, the four additional relationships provided by the inclusion of the discriminator may be defined as:

(5)
$$\omega = \frac{\omega_g}{m(n+1)} \pm \frac{\Omega}{n+1} \pm \Delta \qquad \text{(switch 15—1 position)} \atop \text{(switch 20—B position)}$$

(6)
$$\omega = \frac{\omega_g}{m(n+1)} \pm \frac{\Omega}{n+1} \pm \frac{n\Delta}{n+1} \qquad \text{(switch 15—1 position)} \atop \text{(switch 20—A position)}$$

(7)
$$\omega = \frac{\omega_g}{m(n+1)} \pm \frac{\Omega}{n+1} \qquad \text{(switch 15 in 2 position)} \atop \text{(switch 20 in A position)}$$

(8)
$$\omega = \frac{\omega_g}{m(n+1)} \pm \frac{\Omega}{n+1} \pm \frac{\Delta}{n+1} \qquad \text{(switch 15 in 2 position)} \atop \text{(switch 20 in B position)}$$

The offset frequency $\Omega$ is small compared to $\omega$ and is different from $\Delta$ which is also small compared to $\omega$. Either or both of the null output frequencies $\Delta$ and $\Omega$ of the discriminators 14 and 21 may be continuously variable through a range to provide a vernier adjustment of the stabilized output frequencies other than $\omega_s$.

It is to be noted that in each of the basic relationships defined by Equations 5 to 8, as in Equations 1 to 4, that the major or sole term includes a single frequency $(\omega_g)$ and that the product of the factors $m$ and $n$ identifying the order of harmonic and sub-harmonic used, are both in the denominator of that term and therefore effective to minimize any error in derivation of the frequency $\omega_s$ from the gas line although the percentage error remains the same. It should further be noted that the second term of each of the equations includes $(n+1)$ in the denominator so that the effect of any drift of the null output frequency of the discriminator 21 upon $\omega$ is further minimized.

From the foregoing discussion of Equations 1 to 8 and of the methods and basic systems involved, it should be apparent to those skilled in the art that a single gas line standard may be used simultaneously to provide for stabilization at a multiplicity of lower frequencies and that by simple circuit changes in the stabilizing loop one or more of those frequencies may be shifted to other rigidly stabilized values.

The somewhat simpler arrangement shown in Fig. 2 also provides for stabilization in accordance with any of Equations 1 to 8. In this modification the frequency $(\omega\pm\Delta)$ is produced by a modulating oscillator and a side band filter rather than by a second oscillator operating at a frequency of the same order as that of oscillator 11. Specifically, the oscillator 23 generating oscillations of relatively low frequency $\Delta$ is used to modulate oscillator 11 to produce the side band frequencies $(\omega\pm\Delta)$, one or the other of which is selectively passed by the side band filter 13F. This frequency may be utilized in any of the relationships discussed in connection with Fig. 1 and further discussion of Fig. 2 appears unnecessary as the other circuit components of Fig. 2 having the same functions as those of Fig. 1 are identified by the same reference characters.

In the method and system exemplified by Fig. 3, there is omitted the step or apparatus involving generation of the frequency $(\omega\pm\Delta)$ and from this system there may therefore be omitted the oscillator 12, beat detector 13 and the discriminator 14 of Fig. 1 and the oscillator 23 and filters 13C, 13F of Fig. 2. In Fig. 3, as is possible in Figs. 1 and 2, the frequency is impressed upon the mixer or beat detector 18 are the $n$th harmonic of oscillator 11 and the $m$th sub-harmonic of the gas line frequency $\omega_g$. Both the difference frequency $$\left(\frac{\omega_g}{m} - n\omega\right)$$

appearing in the output of detector 18 and the frequency $\omega$ of oscillator 11 are impressed upon a second beat detector or mixer 19A to produce the difference frequency $$\left[\frac{\omega_g}{m} - \omega(n+1)\right]$$

which is impressed upon a discriminator 14A. The center frequency $\Delta$ of the discriminator 14A is selected or adjusted so that the direct current output of the discriminator is zero when $$\Delta = \frac{\omega_g}{m(m+1)} \pm \omega(n+1)$$

When the difference between the output frequencies of oscillator 11 and beat detector 18 deviate from the center or null-output frequency of discriminator 14A, the direct current output of the discriminator is of polarity and magnitude corresponding with the sense and extent of the deviation and is utilized in manner per se known to effect correction of the frequency of oscillator 11. The frequency of oscillator 11 is thus stabilized in accordance with the basic relationship expressed in Equation 4.

As in the systems of Figs. 1 and 2, the group of stabilized frequencies available from a single standard may readily be changed by changing either or both of the constants $n$ and $m$ which selection may involve no more than adjustment or substitution of a filter, a passive circuit element. As shown by Table A, selection of $m$ and $n$ within a small range of integer values affords a large number of stabilized frequencies. When the frequency change corresponding with such adjustment or substitution is a large one, it may involve, for example, the substitution of one klystron oscillator by another suited for operation in another frequency band.

The methods and systems above described are particularly suitable for but not limited to use of a gas line as a frequency standard and greatly extend the range of frequencies to which gas line stabilization may readily be applied. As gas line resonances occur at frequencies of the order of thousands of megacycles, the production of a subharmonic of a gas line frequency is not practically possible with the frequency-dividing arrangements, such as multi-vibrators, used at lower frequencies. However, subharmonics of a microwave frequency may reliably be generated by any of the novel frequency dividing arrangements 10A, 10B, 10C, Figs. 4–6, suited to produce the frequency $$\omega_s = \frac{\omega_g}{m}$$

used in the above-described methods and systems.

Referring to Fig. 4, the generator 10A for producing oscillations of standard frequency includes a two cavity klystron 30 whose cavities 31, 32 are tuned or tunable for resonance at or near frequency $\omega_s$. Stabilization of the klystron frequency at the value $$\omega_s = \frac{\omega_g}{m}$$

is effected by a control loop connected between the two cavities 31, 32 and including a beat detector 33. Upon one input circuit of the beat detector is impressed the selected $m$th with harmonic of the klystron output frequency. This harmonic may be produced by impressing the output of the klystron upon frequency multiplier 34, which may be a crystal diode, and by selecting the desired $m$th harmonic from the multiplier output by a filter 35. This filter may be of simple type as the next lower and higher harmonics $(m-1)\omega_s$ and $(m+1)\omega_s$ are far removed from the desired harmonic $m\omega_s$. Specifically, filter 35 may be a section of wave guide with tuning plungers generally as disclosed in U. S. Patent No. 2,536,504.

The selected harmonic $m\omega_s$ is transmitted, as by a wave guide or equivalent, to cell 36 containing at suitably low pressure a gas, such as ammonia, exhibiting molecular resonance at the frequency $\omega_g$. For identification of various gases and the frequencies at which they exhibit, reference may be had to copending application Serial No. 1,240, filed January 8, 1948.

The microwave energy passed by cell 36 and subjected during its transmission to the absorptive and/or dispersive action of the gas is applied to one input circuit of detector 33. Upon the other input circuit of the detector is impressed the next higher or lower harmonic of the output frequency of the klystron 30. This frequency $(m+1)\omega_s$ or $(m-1)\omega_s$ is produced by applying the output from klystron cavity 31 to a frequency multiplier 37, similar to 34, and selecting the desired harmonic by a filter 30A similar to filter 35 except as to the frequency selected.

The difference frequency in the output circuit of detector 33 is therefore $\omega_s = m\omega_s - (m\pm 1)\omega_s$ which is equal to $$\omega_s = \frac{\omega_g}{m}$$

When the klystron is operating at precisely the $m$th subharmonic of the gas line frequency $\omega_g$. When the frequency of the generated oscillations starts to drift toward a higher or lower frequency, the gas effects a marked shift in phase of the feedback provided by the output of detector 33 due to the dispersion properties of the spectral line absorption phenomena and the oscillator frequency is returned to proper value.

The specific arrangement of Fig. 4 is claimed in applicant's concurrently filed application Serial No. 218,808 entitled "Stabilization of Oscillators From High Frequency Standards," now Patent No. 2,743,368 issued April 24, 1956.

The modification shown in Fig. 5 is generically similar to Fig. 4 but specifically shows the use of klystrons 34A, 37A as harmonic multipliers and specifically shows microwave filters 34A, 38A serving the purposes of filters 35, 38 of Fig. 4.

In the modification shown in Fig. 6, the generation of frequency $\omega_s$, $m\omega_s$ and $(m\pm1)\omega_s$ are produced by a single klystron 30A having three cavities 32, 31B, 31A respectively tuned or tunable to those frequencies. The filter 38B, tuned to attenuate the frequency $m\omega_s$ is preferably used. The method or principle of operation is generally the same as discussed in connection with Fig. 4.

As exemplary of a specific microwave system incorporating many of the features of Fig. 1, reference is made to Fig. 7. For simplicity of disclosure, switch 15 of Fig. 1 has been omitted but as will be appreciated by those skilled in the art, it may readily be included to obtain all the flexibility of the system of Fig. 1. The corresponding major components of both Figs. 1 and 7 have been identified by the same reference characters with addition of a suitable suffix: consequently, the operation of Fig. 7 can readily be understood from the prior discussion of Fig. 1 and the following description of Fig. 7 is chiefly directed to that of its specific components.

The oscillation generator 11A includes a reflex klystron 40 and a control tube 41. As more fully explained in copending applications including Serial Nos. 194,442, filed November 7, 1950, now Patent No. 2,683,217; 164,977, filed May 29, 1950, now Patent No. 2,714,662; and 164,978, filed May 29, 1950, now Patent No. 2,714,663, the frequency of oscillations generated by klystron 40 may be varied by changing the direct current potential of electrode 42 of the control tube. For stabilization of the frequency $\omega$ of oscillator 11A in accordance with the basic relations discussed in connection with Fig. 1, the variable component of that potential is supplied by the phase comparator 19B corresponding with block 19 of Fig. 1.

The oscillator 12A may be similar to oscillator 11A but is tuned for generation of oscillations at or near the frequency $(\omega\pm\Delta)$. Specifically as shown, it may comprise a reflex klystron 45 and a control tube 46 whose electrode 47 may be considered as the frequency control electrode of the oscillator. The variable component of the potential of electrode 47 is the direct current output of discriminator 14B corresponding with block 14 of Fig. 1. Discriminator 14B is in a servo loop which controls oscillator 12A to maintain its frequency a fixed amount $\Delta$ above or below the frequency of oscillator 11A. This servo loop does not itself hold the frequency of oscillator 12A at a fixed value.

The discriminator 14B may be, as shown of the Foster-Seely type including a pair of diodes 50, 50 coupled by a tuned transformer and phasing network 48 to the beat frequency detector 13A. When the desired frequency difference Δ is not too high, the network 48 may comprise lumped inductances and capacitances; when the frequency Δ is much higher the discriminator network may be of type using coaxial lines, wave guides, or the like. The The diodes 50, 50 may be connected as shown or may be connected in another known manner as a ratio detector.

The beat detector 13A may comprise a diode 51, of crystal or tube type, upon which is impressed the output frequencies of the oscillators 11A and 12A; it may also include or be associated with a filter 52 effectively to decouple the oscillators 11A, 12A from one another. For very high frequencies the filter-mixer arrangement may comprise a section of wave guide and tuning plungers such as shown in aforesaid U. S. Patent No. 2,536,504.

The frequency multiplier or harmonic generator 16A is a klystron 55 whose input and output cavities 56, 57 are respectively tuned or tunable to the frequencies $(\omega \pm \Delta)$ and $n(\omega \pm \Delta)$. If necessary or desirable, a filter 17A for attenuation of other than the $n$th harmonic of the frequency $(\omega \pm \Delta)$ may be interposed between the klystron 55 and the mixer 18A which includes a crystal diode 60. The difference frequency $\omega_s - n(\omega \pm \Delta)$ in the output of mixer 18A is impressed through isolating transformer 61 and amplifier 62 upon that input circuit of the phase comparator 19B having the input terminal 65. For very high frequencies the amplifier 62 may be replaced by a klystron or traveling wave tube amplifier. The phase comparator 19B is similar to that more fully described in copending application Serial No. 164,978, filed May 29, 1950, now Patent No. 2,714,663. Briefly it includes two pair of diodes 66, 67 poled as indicated with the input terminal 65 connected to the common anode and cathode connection of the pair of diodes 66, 66. The other input circuit of the comparator, between the input terminals 68, 68, includes an isolating transformer 69, of type suitable for the frequency involved, for impression upon this input circuit of the comparator of the frequency $\omega$ or $\omega \pm \Delta$, depending upon the position of switch 20A.

The output of comparator 19B includes a smoothing or integrating network 71 connected to the output terminal 70 of the comparator and to the frequency control electrode 42 of control tube 41 of oscillation generator 11A. For one position of switch 20A, the oscillator 11A is stabilized in accordance with Equation 1 whereas for the other position of switch 20A, it is stabilized in accordance with Equation 2; for either switch position, the oscillator 12A is stabilized at the frequency $$(\omega \pm \Delta) = \frac{\omega_g}{m}(n+1)$$

By providing the system of Fig. 7 with a two-pole switch 22, a discriminator having the function of discriminator 21 of Fig. 1 may be included in the main servo loop for stabilization of oscillator 11A at additional frequencies in accordance with Equations 5 and 6. A suitable microwave discriminator 21A for such purpose is schematically shown in Fig. 8 and is more fully described in aforesaid copending application Serial No. 678,554, filed June 22, 1946.

With switch 22 open, the frequency $\omega$ or $(\omega \pm \Delta)$, depending upon the position of switch 20A, is impressed upon a wave guide 80 as by a coupling loop 81 or equivalent. The branch guides 82, 83 transmit the energy from guide 80 to a closed-ended section 84, of a wave guide, into which extend the diode probes 85, 85 on opposite sides of the junctions with the branch guides. The cavity 86 interposed in one of the branch guides is resonant at or tuned or tunable to the null output frequency of the discriminator.

The relative length of the branch guides and the orientation of their junctions with wave guide section 84 is such that the out-of-phase components of the potentials at the probes 85, 85 are in time quadrature at the frequency $\omega + \Omega$. At that frequency there is no difference of potential between the terminals of the output resistor 87 of the discriminator 21A. When the impressed frequency is above or below the null output frequency $\omega \pm \Omega$, there is produced across the resistor 87 a difference of potential whose polarity and magnitude is dependent upon the frequency deviation. With switch 22 open, this voltage is algebraically added to the output of the phase comparator 19B, Fig. 7, jointly to determine the potential of the frequency control electrode 42 of oscillator 11A in accordance with Equation 5 or 6.

The modification shown in Fig. 9 corresponds with the block diagram of Fig. 2 in which the frequency $(\omega \pm \Delta)$ is generated by modulating the oscillator 11 of Fig. 2 or the corresponding oscillator 11A of Fig. 7. To generate the frequencies $\omega \pm \Delta$, the output of the microwave oscillator 11A and the lower-frequency modulating oscillator 23A are mixed, as by the crystal diode 90, and the desired upper or lower side band $(\omega + \Delta)$ or $(\omega - \Delta)$ is selected by filter 13F. The oscillator 23A, may as shown, be of known type using an electronic tube 91, a tuned anode circuit and a piezo-electric crystal 92 in the grid circuit. When it is desired to vary the stabilized frequencies over a small percentage range, the oscillator 23A may be of known type using variable inductance or capacity for tuning. The number of available stabilized frequencies may be increased by provision of switch 22 for inclusion or exclusion of a discriminator such as shown in Fig. 8 for example.

The system shown in Fig. 10 corresponds with Fig. 3 and specifically shows components suited for operation at microwave frequencies. Operation of the system is similar to that of Fig. 3 and may be understood by reference thereto; the corresponding elements of both figures are identified by like reference characters with addition, thereto in Fig. 10, of a suitable suffix.

The detectors 18B and 19B for respectively producing the difference frequencies $$\left(\frac{\omega_g}{m} - n\omega\right)$$

and $$\left[\left(\frac{\omega_g}{m} - n\omega\right) - \omega\right]$$

are of type disclosed in copending application Serial No. 700,879, filed October 3, 1946.

Briefly, the detector 18B comprises a capacity 95 which is coupled by loop 96 or equivalent to the oscillation generator 10 stabilized at the desired sub-harmonic $m$ of the gas line frequency $\omega_g$. This frequency $(\omega_g)$ is applied to a pair of diodes 97, 97 connected to opposite ends of a loop 98 within the cavity 95. The frequency $n\omega$ is applied to diodes 97, 97 by a connection 99 from the mid-point of loop 98 to a coupling loop 100, or equivalent, extending into the output cavity of the harmonic generator klystron 16A or, as shown, into the cavity of a microwave filter 17B coupled to that tube.

The output circuit of beat detector 18B includes a loop 101 extending from the diodes 97, 97 into the cavity 102 of the second beat detector 19B. Another loop 103 within cavity 102 applies the difference frequency $$\left(\frac{\omega_g}{m} - n\omega\right)$$

upon the diodes 104, 104 of the second beat detector 19B. Output frequency $\omega$ of oscillator 11A is applied to diodes 104, 104 by the connection 105 from the mid-point of loop 103 to the output line of oscillator 11A. The difference frequency output $$\left[\left(\frac{\omega_g}{m} - n\omega\right) - \omega\right]$$

of detector 19B is applied to the discriminator 14C which may be of the same type as the discriminator 14B of Fig. 7 or which may, as shown, be of the ratio detector type comprising a pair of diodes 106, 106 having the cathode of one and the anode of the other connected to opposite terminals of the secondary of the discriminator transformer 48C.

When the frequency impressed upon discriminator 14C deviates in either sense from the null output frequency $\Delta$ of the discriminator, the direct current output of the discriminator is of corresponding polarity and magnitude and as applied to control electrode 42 effects correction of the frequency of oscillator 11A for stabilization of its frequency in accordance with Equation 4.

The arrangements shown in Figs. 7, 9, and 10 are but a few examples of specific stabilizing systems incorporating the features at length discussed in connction with Figs. 1, 2 and 3. From that discussion and disclosure of specific embodiments, other generically similar arrangements within the scope of the appended claims will be obvious to those skilled in the art of oscillator frequency control.

What is claimed is:

1. In a frequency-stabilizing system, a servo loop including oscillator means for generating signal frequencies $\omega$ and $\omega\pm\Delta$, a frequency multiplier connected to said oscillator means to provide the $n$th harmonic of one of said signal frequencies, a mixer connected to said multiplier to receive the output of said multiplier and a signal of standard frequency $\omega_s$ separately stabilized, thereby to produce a difference frequency signal, a comparator connected to said mixer to receive said difference frequency signal and connected to said oscillator means to receive one of the signal frequencies generated thereby to produce an error signal, oscillator stabilizing means connected to said oscillator means and connected to receive and be controlled by said error signal to stabilize one of said oscillator means signal frequencies, a second servo system including a mixer connected to said oscillator means to receive the signal frequencies $\omega$ and $\omega\pm\Delta$, a discriminator having null output for the signal frequency $\Delta$ connected to receive the output of said second servo system mixer, and means connected to said discriminator to receive and be responsive to the discriminator output and connected to said oscillator means for maintaining a constant signal frequency difference between the signal frequencies $\omega\pm\Delta$, the two servo systems jointly stabilizing both the signal frequencies $\omega$ and $\omega\pm\Delta$ and thereby stabilizing the output frequencies dependent thereon.

2. In a frequency-stabilizing system, a servo loop including oscillator means for generating the signal frequencies $\omega$ and $\omega\pm\Delta$, a frequency multiplier connected to said oscillator means to provide and amplify the $n$th harmonic of one of said signal frequencies, a mixer connected to said multiplier to receive the output of said multiplier and a signal of standard frequency $\omega_s$ separately stabilized, thereby to produce a difference signal frequency, a comparator connected to said mixer to receive said difference signal frequency and connected to said oscillator means to receive one of the signal frequencies generated thereby to produce an error signal, and oscillator stabilizing means connected to said oscillator means and connected to receive and be controlled by said error signal to stabilize one of said oscillator means signal frequencies, the signal frequency amplified by said multiplier being $n(\omega+\Delta)$ and said comparator having a selector in an input circuit of the comparator to provide for selective impression thereon of the signal frequencies $\omega$, $\omega\pm\Delta$ to shift the stabilized signal frequency $\omega$ to an extent corresponding to the difference between $$\Delta \text{ and } \pm\frac{n}{n+1}\Delta$$

3. In a frequency-stabilizing system, a servo loop including oscillator means for generating signal frequencies $\omega$ and $\omega\pm\Delta$, a frequency multipled connected to said oscillator means to provide the $n$th harmonic of one of said signal frequencies, a mixer connected to said multiplier to receive the output of said multiplier and a signal of standard frequency $\omega_s$ separately stabilized, thereby to produce a difference frequency, a comparator connected to said mixer to receive said difference frequency signal and connected to said oscillator means to receive one of the signal frequencies generated thereby to produce an error signal, and oscillator stabilizing means connected to said oscillator means and connected to receive and be controlled by said error signal to stabilize one of said oscillator means signal frequencies, the signal frequency provided by the multipler being $n\omega$ and said comparator having a selector in an input circuit of the comparator to provide for selective impression thereon of the signal frequencies $\omega$, $\omega\pm\Delta$ to shift the stabilized signal frequency $\omega$ to an extent corresponding to $$\pm\frac{\Delta}{n+1}$$

4. In a frequency-stabilizing system, a servo loop including oscillator means for generating signal frequencies $\omega$ and $\omega\pm\Delta$, a frequency multipled connected to said oscillator means to provide the $n$th harmonic of one of said signal frequencies, a mixer connected to said multiplier to receive the output of said multiplier and a signal of standard frequency $\omega_s$ separately stabilized, thereby to produce a difference frequency, a comparator connected to said mixer to receive said difference frequency signal and connected to said oscillator means to receive one of the signal frequencies generated thereby to produce an error signal, and oscillator stabilizing means connected to said oscillator means and connected to receive and be controlled by said error signal to stabilize one of said oscillator means signal frequencies, said comparator being a frequency comparator and said multiplier and said comparator having input circuits including selectors to provide for selection of one of the frequencies $\omega$, $\omega\pm\Delta$ for selective stabilization of signal frequency $\omega$ at any selected one of the frequencies $$\left(\frac{\omega_s}{n+1}\pm\frac{n\Delta}{n+1}\right), \left(\frac{\omega_s}{n+1}\pm\Delta\right), \left(\frac{\omega_s}{n+1}\right)$$

and $$\left(\frac{\omega_s}{n+1}\pm\frac{\Delta}{n+1}\right)$$

5. In a frequency-stabilizing system, a servo loop including oscillator means for generating signal frequencies $\omega$ and $\omega\pm\Delta$, a frequency multiplier connected to said oscillator means to provide the $n$th harmonic of one of said signal frequencies, a mixer connected to said multiplier to receive the output of said multiplier and a signal of standard frequency $\omega_s$ separately stabilized, thereby to produce a difference frequency, a comparator connected to said mixer to receive said difference frequency signal and connected to said oscillator means to receive one of the signal frequencies generated thereby to produce an error signal, and oscillator stabilizing means connected to said oscillator means and connected to receive and be controlled by said error signal to stabilize one of said oscillator means signal frequencies, said comparator being a discriminator having null output at frequency $\Omega$ and said multiplier and said comparator having input circuits including selector means to provide for selective impression thereon of one of the signal frequencies $\omega$, $\omega\pm\Delta$ for selective stabilization of signal frequency $\omega$ at any selected one of the frequencies $$\left(\frac{\omega_s}{n+1}\right)\pm\frac{\Omega}{n+1}\pm\Delta$$

$$\left(\frac{\omega_s}{n+1}\pm\frac{\Omega}{n+1}\pm\frac{n\Delta}{n+1}\right), \left(\frac{\omega_s}{n+1}\pm\frac{\Omega}{n+1}\right)$$

and $$\left(\frac{\omega_s}{n+1}\pm\frac{\Delta}{n+1}\pm\frac{\Omega}{n+1}\right)$$

6. In a frequency-stabilizing system, a servo loop including oscillator means for generating the signal frequencies $\omega$ and $\omega\pm\Delta$, a frequency multiplier connected to said oscillator means to provide the $n$th harmonic of one of said signal frequencies, a mixer connected to said multiplier to receive the output of said multiplier and a signal of standard frequency $\omega_s$ separately stabilized, thereby to produce a difference frequency, a comparator connected to said mixer to receive said difference frequency signal and connected to said oscillator means to receive one of the signal frequencies generated thereby to produce an error signal, and oscillator stabilizing means connected to said oscillator means and connected to receive and be controlled by said error signal to stabilize one of said oscillator means signal frequencies, said oscillator means including an oscillator of signal frequency $\omega$ and means to modulate said oscillator by signal frequency $\Delta$, said comparator being a phase detector and said multiplier and comparator having input circuits with selector means to provide for selective impression thereon of one the signal frequencies $\omega$, $\omega\pm\Delta$ for stabilizing of the signal frequency $\omega$ of said oscillator at a selected one of the frequencies $$\left(\frac{\omega_s}{n+1}\pm\frac{n\Delta}{n+1}\right), \left(\frac{\omega_s}{n+1}\pm\Delta\right), \left(\frac{\omega_s}{n+1}\right)$$

and $$\left(\frac{\omega_s}{n+1}\pm\frac{\Delta}{n+1}\right)$$

7. In a frequency-stabilizing system, a servo loop including oscillator means for generating signal frequencies $\omega$ and $\omega\pm\Delta$, a frequency multiplier connected to said oscillator means to provide the $n$th harmonic of one of said signal frequencies, a mixer connected to said multiplier to receive the output of said multiplier and a signal of standard frequency $\omega_s$ separately stabilized, thereby to produce a difference frequency, a comparator connected to said mixer to receive said difference frequency signal and connected to said oscillator means to receive one of the signal frequencies generated thereby to produce an error signal, and oscillator stabilizing means connected to said oscillator means and connected to receive and be controlled by said error signal to stabilize one of said oscillator means frequencies, said oscillator means comprising an oscillator of signal frequency $\omega$ and means to modulate said oscillator by signal frequency $\Omega$, said comparator being a discriminator having null output at signal frequency $(\omega\pm\Omega)$, and said multiplier and discriminator having input circuits including selector means to provide for selection of signal frequencies $\omega$ $\omega\pm\Delta$ for stabilization of the signal frequency $\omega$ of said oscillator at a selected one of the frequencies $$\left(\frac{\omega_s}{n+1}\pm\frac{\Omega}{n+1}\pm\Delta\right), \left(\frac{\omega_s}{n+1}\pm\frac{\Omega}{n+1}\pm\frac{n\Delta}{n+1}\right)$$

$$\left(\frac{\omega_s}{n+1}\pm\frac{\Omega}{n+1}\right)$$

and $$\left(\frac{\omega_s}{n+1}\pm\frac{\Delta}{n+1}\pm\frac{\Omega}{n+1}\right)$$

References Cited in the file of this patent
UNITED STATES PATENTS

| | | |
|---|---|---|
| 2,507,317 | Moore | May 9, 1950 |
| 2,543,058 | Ranger | Feb. 27, 1951 |
| 2,560,365 | Norton | July 10, 1951 |
| 2,581,594 | MacSorley | Jan. 8, 1952 |
| 2,595,608 | Robinson | May 6, 1952 |
| 2,707,231 | Townes | Apr. 26, 1955 |